(12) United States Patent
Liang et al.

(10) Patent No.: US 11,543,830 B2
(45) Date of Patent: Jan. 3, 2023

(54) UNSUPERVISED REAL-TO-VIRTUAL DOMAIN UNIFICATION FOR END-TO-END HIGHWAY DRIVING

(71) Applicant: Petuum Inc., Pittsburgh, PA (US)

(72) Inventors: Xiaodan Liang, Pittsburgh, PA (US); Eric P Xing, Pittsburgh, PA (US)

(73) Assignee: PETUUM, INC., Pittsburgh, PA (US)

( * ) Notice: Subject to any disclaimer, the term of this patent is extended or adjusted under 35 U.S.C. 154(b) by 380 days.

(21) Appl. No.: 16/140,311

(22) Filed: Sep. 24, 2018

(65) Prior Publication Data

US 2019/0171223 A1 Jun. 6, 2019

Related U.S. Application Data

(60) Provisional application No. 62/595,512, filed on Dec. 6, 2017, provisional application No. 62/618,882, filed on Jan. 18, 2018.

(51) Int. Cl.
*G05D 1/02* (2020.01)
*G05D 1/00* (2006.01)
(Continued)

(52) U.S. Cl.
CPC ......... *G05D 1/0246* (2013.01); *G05D 1/0088* (2013.01); *G06K 9/6264* (2013.01);
(Continued)

(58) Field of Classification Search
CPC ............... G05D 1/0246; G05D 1/0088; G05D 2201/0213; G06T 11/60; G06T 11/00;
(Continued)

(56) References Cited

U.S. PATENT DOCUMENTS

2018/0285659 A1* 10/2018 Kwant ............... G06K 9/00798
2019/0102668 A1* 4/2019 Yao ........................... G06K 9/00
(Continued)

OTHER PUBLICATIONS

"The Synthia Dataset: A Large Collection of Synthetic Images for Semantic Segmentation of Urban Scenes", Ros et al., Jun. 1, 2016, 2016 IEEE Conference on Computer Vision and Pattern Recognition (Year: 2016).*

(Continued)

*Primary Examiner* — Nadeem Odeh
(74) *Attorney, Agent, or Firm* — MagStone Law, LLP; Enshan Hong

(57) ABSTRACT

An unsupervised real to virtual domain unification model for highway driving, or DU-drive, employs a conditional generative adversarial network to transform driving images in a real domain to their canonical representations in the virtual domain, from which vehicle control commands are predicted. In the case where there are multiple real datasets, a real-to-virtual generator may be independently trained for each real domain and a global predictor could be trained with data from multiple real domains. Qualitative experiment results show this model can effectively transform real images to the virtual domain while only keeping the minimal sufficient information, and quantitative results verify that such canonical representation can eliminate domain shift and boost the performance of control command prediction task.

19 Claims, 11 Drawing Sheets

(51) Int. Cl.
  *G06N 3/04* (2006.01)
  *G06N 3/08* (2006.01)
  *G06T 3/00* (2006.01)
  *G06K 9/62* (2022.01)
  *G06T 9/00* (2006.01)
  *G06N 20/00* (2019.01)
  *G06T 11/60* (2006.01)
  *G06V 20/58* (2022.01)
  *G06V 20/56* (2022.01)

(52) U.S. Cl.
  CPC ......... *G06K 9/6267* (2013.01); *G06N 3/0454* (2013.01); *G06N 3/088* (2013.01); *G06N 20/00* (2019.01); *G06T 3/0012* (2013.01); *G06T 9/002* (2013.01); *G06T 11/60* (2013.01); *G06V 20/58* (2022.01); *G06V 20/588* (2022.01); *G05D 2201/0213* (2013.01)

(58) Field of Classification Search
  CPC ..... G06T 9/002; G06T 3/0012; G06K 9/6267; G06K 9/6264; G06K 9/00805; G06K 9/00798; G06N 20/00; G06N 3/088; G06N 3/0454; G06N 3/0472; G06V 20/58; G06V 20/588; G06V 10/82; G06V 10/764
  See application file for complete search history.

(56) References Cited

U.S. PATENT DOCUMENTS

2019/0147582 A1* 5/2019 Lee .................. G06T 5/005
  382/156
2020/0342643 A1* 10/2020 Gouws ................. G06N 3/04

OTHER PUBLICATIONS

"Semi Supervised Segmentation Using Generative Adversarial Network", Souly et al., Oct. 1, 2017, 2017 IEEE International Conference on Computer Vision (Year: 2017).*

* cited by examiner

UNSUPERVISED REAL-TO-VIRTUAL DOMAIN UNIFICATION FOR END-TO-END HIGHWAY DRIVING

CROSS-REFERENCE TO RELATED APPLICATION(S)

This application claims the benefit of and priority to (1) U.S. Provisional Patent Application Ser. No. 62/595,512, filed on Dec. 6, 2017, for "Unsupervised Real-to-Virtual Domain Unification for End-to-End Highway Driving", and (2) U.S. Provisional Patent Application Ser. No. 62/618,882, filed on Jan. 18, 2018, for "Unsupervised Real-to-Virtual Domain Unification for End-to-End Highway Driving", the entire disclosures of which are incorporated herein by reference.

TECHNICAL FIELD

The present disclosure relates generally to vision-based autonomous device systems, and more particularly, to an apparatus and method for operating an autonomous device using unsupervised real-to-virtual domain unification.

BACKGROUND

With reference to FIG. 1, various models have been proposed for vision-based autonomous driving. In vanilla end-to-end driving models, a single frontal camera image is mapped to vehicle control commands. These models, however, are not interpretable and are suboptimal in performance. Mediated perception models, such as those with scene parsing or with vehicle/lane detection, attempt to improve the performance of vanilla end-to-end models by taking advantage of intermediate representations. For example, some attempts use semantic segmentation as a side task to improve model performance, while other attempts train a detector to detect nearby vehicles before making driving decisions. However, the collection of driving data and the annotation of intermediate representation can be prohibitively expensive in a larger scale. Moreover, in these models, general images and intermediate representations of driving scenes are loaded with superfluous details due to the complexity of the real world. Many of those details are nuisance information that is neither relevant nor helpful to the prediction task. For example, a typical human driver driving on a highway will not change her behavior according to the brand of the car in front, or the view beyond the road boundaries.

Ideally, a vision-based autonomous driving model trained for a specific task should be able to generalize to new datasets collected for the same task. Research, however, has shown that model performance could seriously degrade when input distribution changes due to the inherent bias introduced in the data collection process. This phenomenon is known as domain shift or dataset bias. In the world of autonomous driving, it is even more critical to have a model that can generalize well to unseen scenarios.

Domain adaption methods attempt to battle domain shift by bridging the gap between the distribution of source data and target data. Various models involving generative adversarial network (GAN) based domain adaption, also known as adversarial adaption, have achieved acceptable results in the field of visual domain adaption. One such model frames adversarial adaption as training a generator that transforms data in the target domain to the source domain at a certain feature level trying to fool an adversarial discriminator, which in turn tries to distinguish the generated data from those sampled from the source domain. See E. Tzeng, J. Hoffman, K. Saenko, and T. Darrell. Adversarial discriminative domain adaptation. In *Computer Vision and Pattern Recognition (CVPR)*, 2017 *IEEE Conference on*, pages 7167-7176. IEEE, 2017.

One subarea of domain adaptation involves the adaption of virtual data to real data. As the collection of real-world data can be excessively expensive in certain cases, virtual data rendered with computer graphics technologies can be useful. One method proposes a GAN-based model that transforms data from virtual domain to the real domain in the pixel space in an unsupervised manner by utilizing a content-similarity loss to retain annotation. See K. Bousmalis, N. Silberman, D. Dohan, D. Erhan, and D. Krishnan. Unsupervised pixel-level domain adaptation with generative adversarial networks. In *Proceedings of the IEEE conference on computer vision and pattern recognition*, pages 3722-3731, 2017.

Another method uses adversarial training to improve the realism of synthetic or fake images with the help a self-regularization term, a local adversarial loss and a buffer of training images for the discriminator. See A. Shrivastava, T. Pfister, O. Tuzel, J. Susskind, W. Wang, and R. Webb. Learning from simulated and unsupervised images through adversarial training. In *The IEEE Conference on Computer Vision and Pattern Recognition (CVPR)*, July 2017. Another method randomizes the texture of objects in the robot simulator and trains a visuomotor policy without using any real-world data. See J. Tobin, R. Fong, A. Ray, J. Schneider, W. Zaremba, and P. Abbeel. Domain randomization for transferring deep neural networks from simulation to the real world. arXiv preprint arXiv: 1703.06907, 2017. Another method trains a driving policy with reinforcement learning in a simulator by transforming virtual images to real images, retaining the scene structure with adversarial loss on the segmentation mask. See Y. You, X. Pan, Z. Wang, and C. Lu. Virtual to real reinforcement learning for autonomous driving. arXiv preprint arXiv: 1704.03952, 2017.

These GAN-based models, however, have issues that render them less than optimal. For example, with reference to FIG. 2, fake images generated by conditional GAN suffer from unstable training and mode collapse for both the background and the foreground. This is event in FIG. 2 by the disjointed and collapsed lane markings in the fake virtual images in the bottom row. With reference to FIG. 3, fake images generated by a GAN referred to as CycleGAN may include additional image details that are not critical to autonomous device command prediction. Moreover, since CycleGAN involves transformations from simple virtual images to realistic looking fake real images that are more complex than virtual images, image generation is resource intensive, and the generated fake real images often include undesired hallucinated details. This is event when comparing the bottom two rows of FIG. 3 to each other.

SUMMARY

The apparatuses and methods of commanding an operation of an autonomous device disclosed herein, involve obtaining one or more real operating images associated with operation of the autonomous device, transforming each of the one or more real operating images to its corresponding canonical representation, and predicting an operating parameter for the autonomous device based on the one or more canonical representations.

The autonomous device may be any device that operates autonomously or semi-autonomously, such as a car, boat, plane, drone, or robot. The real operating images may be obtained from a camera associated with the autonomous device. For example, in the case of commanding a steering operation of the autonomous device, the real operating images may be obtained from a front-facing camera of the device. The real operating images include predictive information and background information. The predictive information corresponds to information relative to the operation to be commanded. For example, if the operation relates to steering the device, then predictive information may include lane marking on the road. Conversely, background information corresponds to information that is not relevant or essential to the operation to be commanded. Again, if the operation relates to steering the device, then background information may include vehicles or other objects in the horizon or off to either side of the road.

In aspects of the apparatuses and methods, the real operating image is transformed to a corresponding canonical representation by mapping the real operating image to a corresponding unique, pixel-level fake virtual image sampled from a database of true virtual images. This mapping may be performed by a deep learning algorithm, embodied as a generator module, that is trained to perform the mapping function. These canonical representations, or fake virtual images, contain sufficient predictive information from which to predict an operating parameter and substantially no background information. In one configuration, the true virtual images to which real operating images are mapped are generated using computer graphics technology for an operating experience of the autonomous device, and are annotated with corresponding ground-truth operating parameters of the autonomous device.

In other aspects of the apparatuses and methods, command prediction may be performed by a deep learning algorithm, embodied as a predictor module, that is trained to predict an operating parameter based on the canonical representations. For example, the predictor may be trained to map a fake virtual image to a particular command in a library of commands based on prediction information present in the fake virtual image.

In further aspects of the apparatuses and methods, the generator module and the predictor module are respectively trained to generate canonical representations of real operating images, and to predict the operating parameter based on the canonical representation. In one embodiment, the generator module and the predictor module are trained simultaneous in parallel using a generative adversarial neural network (GAN) in an unsupervised manner. The training is done using a first database of real source images, and a second database of virtual source images. The real source images may be annotated with corresponding ground-truth operating parameters obtained from a real operating experience, while the second database of virtual source images may be annotated with corresponding ground-truth operating parameters obtained from the same operating experience. The virtual driving images may be generated using computer graphics technology. During training using the GAN, an objective of the generator module is to increase its ability to generate fake virtual images that fools a discriminator module, while an objective of the discriminator module is to increase its ability to correctly discriminates fake virtual images from true virtual images.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

The apparatus and method for operating an autonomous device disclosed herein and referred to as the DU-drive model, overcomes issues associated with known models. First, the DU-drive model predicts autonomous device commands based on virtual images instead of real images. To this end, the DU-drive introduces an unsupervised real-to-virtual domain unification framework that transforms real images into corresponding canonical representations in the virtual domain, and uses these virtual images to predict device commands. This is opposite of the approach of known methods, which transform simple virtual images to realistic looking fake real images. The transformation from real images to virtual images introduced by the DU-drive model is an easier task as it is more manageable to go from complex to simple, and all real datasets could be unified into their canonical representations in the virtual domain where nuisance details are eliminated. Second, the DU-drive model introduces a joint training scheme that results in the generation of virtual images with reliable prediction information, i.e., information that is critical to determination of an operation command and that does not suffer from scene alterations, such as mode collapse. The joint training scheme also reduces from the generated virtual images, background or side information that is not essential to command prediction. Furthermore, since any real image can only have one canonical representation, the DU-drive model does not introduce any noise variable in the image transformation process.

DU-Drive Model Operation Architecture

Figure 1:
FIG. 1 is a collection of images of different known vison-based driving models including (a) vanilla end-to-end, (b) scene parsing and (c) vehicle/lane detection.
Figure 2:
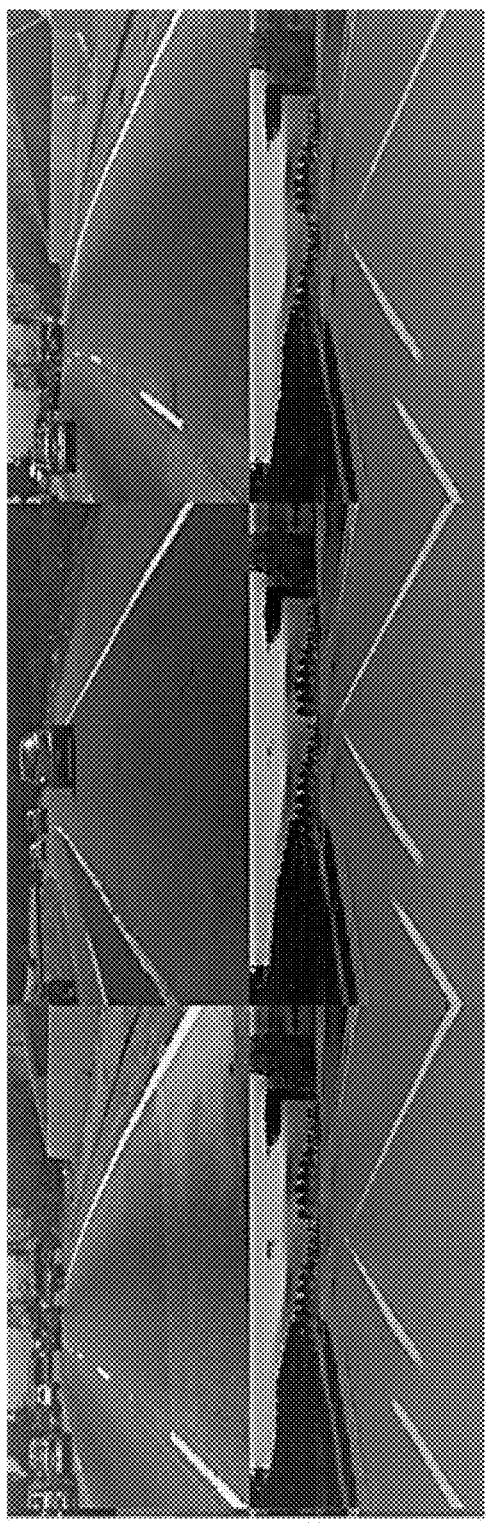
FIG. 2 are real source images and their corresponding fake virtual images generated by a known generative adversarial neural network (GAN) referred to as conditional GAN.
Figure 3:
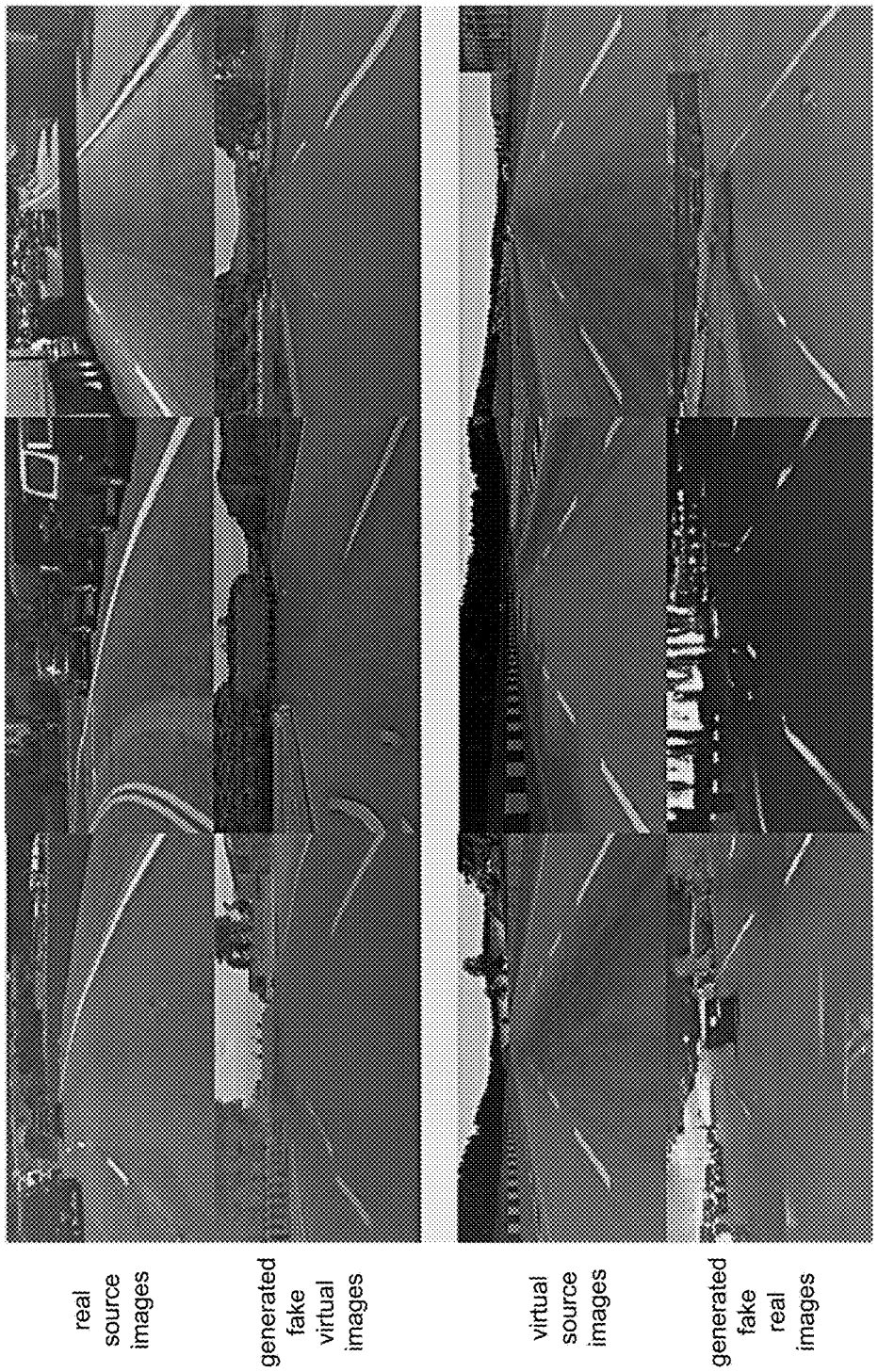
FIG. 3 are real source images and their corresponding fake virtual images generated by a known generative adversarial neural network (GAN) referred to as CycleGAN, and virtual source images and their corresponding fake real images generated by CycleGAN.
Figure 4A:
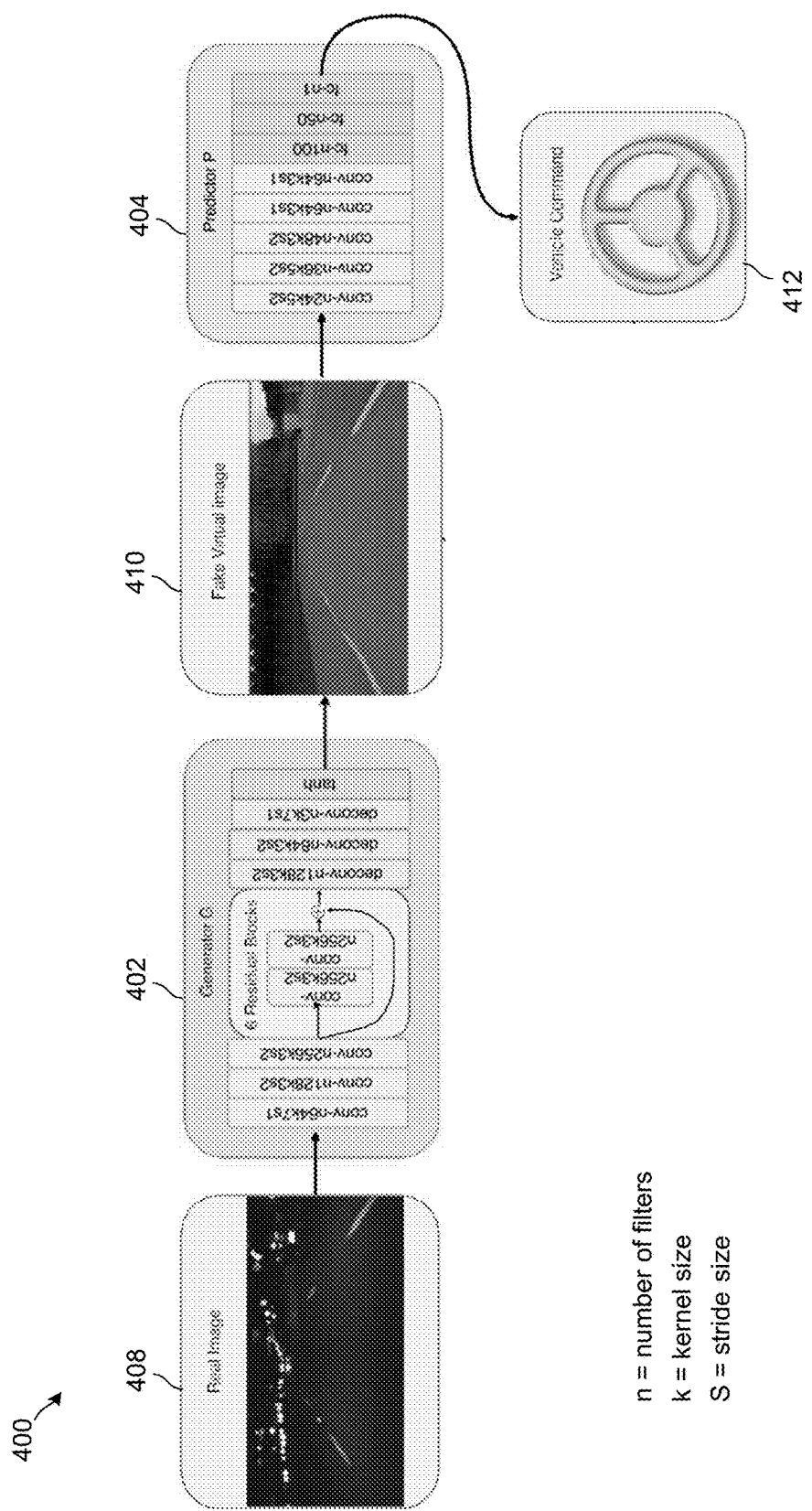
FIG. 4A is a block diagram of the architecture for a vison-based autonomous driving model referred to herein as a DU-drive model, including a generator module and a predictor module.

FIG. 4A is a block diagram of the operation architecture of the DU-drive model 400 that may be used in association with an autonomous device, such as a road vehicle or an air vehicle, to control an operation of the device. For example, the autonomous device may be any device that operates autonomously or semi-autonomously, such as an autonomous or semi-autonomous car, boat, plane, drone, and robot. The DU-drive model 400 includes a generator module 402 and a predictor module 404.

The generator 402 includes convolutional layers, followed by residual blocks, followed by deconvolutional layers. In one configuration, two of the convolutional layers are 3×3 kernel and stride size 2. Two deconvolutional layers with stride ½ then transform the feature to the same size as the input real operating image 408. Instance normalization is used for all the layers. In operation, the generator 402 receives an input corresponding to one or more real operating images 408 and transforms each real operating image 408 input to a fake virtual image 410.

Real operating images are images of real-world scenes related to the autonomous device during operation of the device. For example, a real operating image 408 may be obtained or captured by a camera that is associated with the autonomous device. In the case of a road vehicle, the camera may be a front-mounted camera that captures images of the road facing the vehicle. The fake virtual image 410 corresponds to a canonical representation of the real operating image in the virtual domain. As used herein a "canonical representation" refers to a pixel level representation that includes reliable prediction information and a minimum of non-essential background information.

The one or more fake virtual images 410 are input to the predictor 404. The predictor 404 includes five convolutional layers and three fully connected layers. The first three convolutional layers have kernel size 5×5 and stride size 3, while the last two layers have kernel size 3×3 and stride size 1. No padding is used. The last convolutional layer is flattened and immediately followed by four fully connected layers with output size 100, 50, and 1 respectively. All layers use ReLU activation. In an alternate configuration, the predictor 404 includes four fully connected layers with output size 100, 50, 10 and 1 respectively. The predictor 404 may be based on the network architecture used in DAVE-2 system described in M. Bojarski, D. Del Testa, D. Dworakowski, B. Firner, B. Flepp, P. Goyal, L. D. Jackel, M. Monfort, U. Muller, J. Zhang, et al. End to end learning for self-driving cars. arXiv preprint arXiv: 1604.07316, 2016.

The predictor 404 is configured to process the fake virtual images 410 and output a vehicle command 412. To this end, a prediction algorithm is applied to the fake virtual image 410 and an output command is determined. The predictor 404 may be trained to map a fake virtual image to a particular command in a library of commands based on prediction information present in the fake virtual image. For example, the predictor 404 may detect lane markings included in the fake virtual image and match one or more characteristics of the lane markings, such as a degree of curvature, to a command related to steering angle.

DU-Drive Model Learning Objective

Figure 4B:
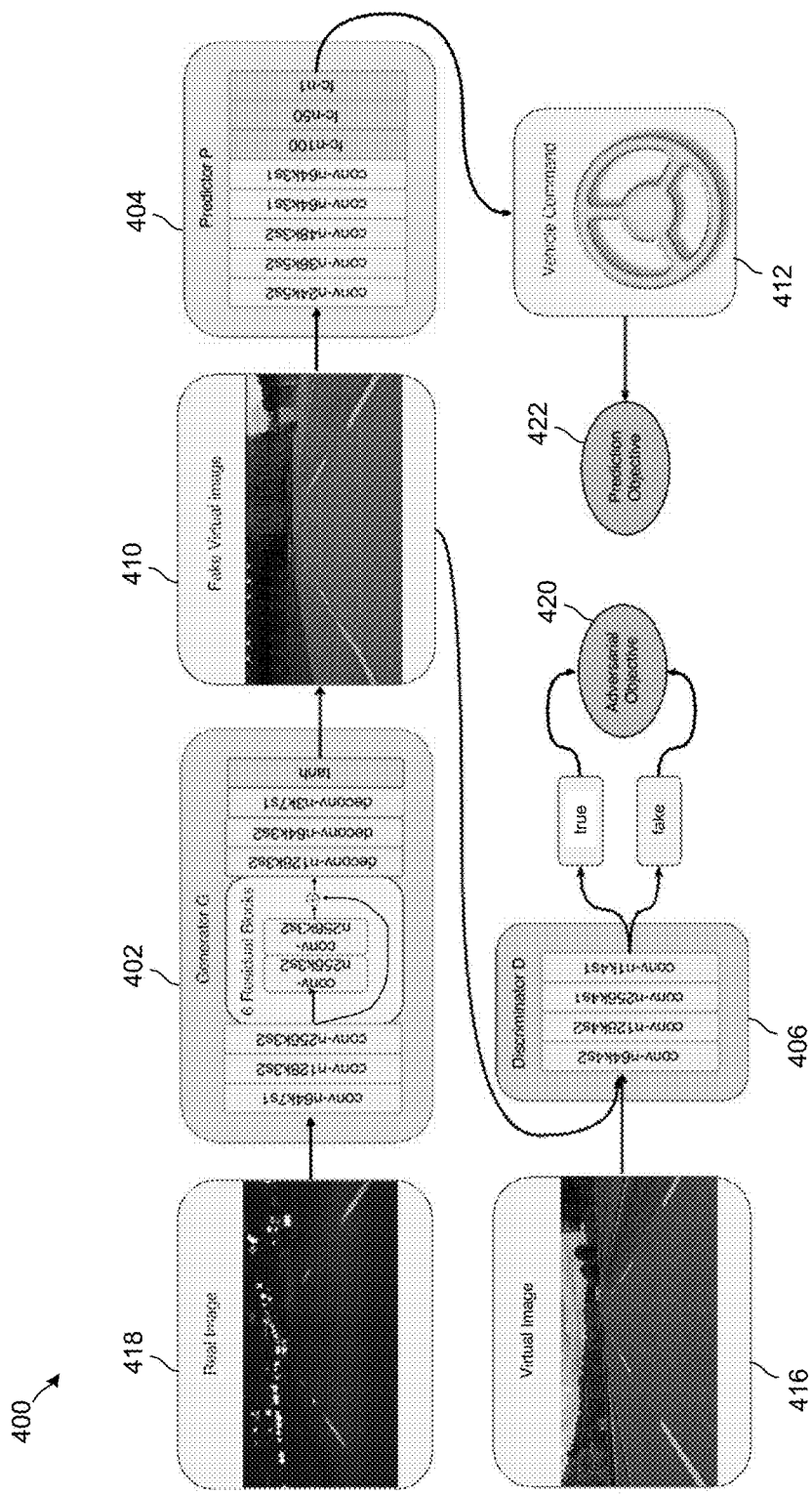
FIG. 4B is a block diagram of an architecture for training the generator of FIG. 4A using a discriminator and datasets of true virtual images and real source images.

FIG. 4B is a block diagram of a learning objective or training aspect of the DU-drive model that trains or drives the generator 402 to generate fake virtual images 410 that are most helpful to the prediction task. The learning objective or training aspect of the DU-drive involves the generator 402, a discriminator 406, the predictor 404, and datasets of true virtual images 416 and real source images 418.

During training, the generator 402 receives inputs corresponding to real source images 418. Real source images 418 are images of real-world scenes related to the operation of other devices that are obtained from a dataset. These real source images correspond to real operating images annotated with corresponding ground-truth operating parameters or commands obtained from a real operating experience. For example, the real source images 418 may be obtained from the one or more datasets of real source images, such as from comma.ai or Udacity, and may include annotations in the form of steering control commands.

The generator 402 transforms each real source image 418 input to a fake virtual image 410. The one or more fake virtual images 410 are input to the discriminator 406, together with one or more true virtual images 416. True virtual images are virtual images of scenes related to the operation of a computer simulated device and are generated using computer graphics technology. These true virtual images correspond to virtual operating images annotated with corresponding ground-truth operating parameters or commands obtained from the same operating experience as the real source images. For example, the true virtual images 416 may be obtained from a virtual driving simulator such as TORCS, and may include annotations in the form of steering control commands.

The discriminator 406 includes a fully convolutional network with convolutional layers of filter size 64, 128, 256 and 1 respectively. Each convolutional layer is followed by instance normalization and Leaky ReLU nonlinearity. The discriminator 406 attempts to distinguish fake virtual images 410 from true virtual images 416. Both an adversarial objective 420 and a prediction objective 422 drive the generator 402 to generate fake virtual images 410 that are most helpful to the prediction task. Generally, an objective of the generator 402 is to increase its ability to generate fake virtual images 410 that fool the discriminator 406, while an objective of the discriminator is to increase its ability to correctly discriminates fake virtual images from true virtual images 416.

Thus, given datasets of real source images 418 and true virtual images 416, each annotated with ground-truth operating parameters operation commands, the learning objective trains the generator 402 to transform a real operating image 408 to its corresponding canonical representation 410 in the virtual domain.

The DU-drive model 400 invokes aspects of a conditional generative adversarial network (GAN), in that the generator 402 and discriminator 406 both take a conditional factor as input, yet different in two aspects. First, in the DU-drive model 400, the discriminator 406 does not depend on the conditional factor. Second, in the DU-drive model 400, the generator 402 does not take any noise vector as input. Unlike traditional mapping from a plain virtual image to a rich real image, where there could be multiple feasible solutions, in the DU-drive model 400, the mapping from a real operating image 408 to its fake virtual image 410, i.e., its corresponding canonical representation, contains only the minimal sufficient information for the prediction task. Therefore, the DU-drive model 400 removes the noise term inherent in conventional GANs and use a deterministic generative network as its generator 402.

More formally, let $X^r=\{x_i^r, y_i^r\}_{i=1}^{N_r}$ be a labeled dataset with $N^r$ samples in the real domain, and let $X^v=\{x_i^v, y_i^v\}_{i=1}^{N_v}$ be a labeled dataset with $N^v$ samples in the virtual domain, where x is the frontal image and y is the corresponding vehicle command. The generator 402 is a deterministic conditional generator characterized by the function $G(x^r; \theta_G) \to x^f$, parametrized by $\theta_G$. The generator 402 is configured to map a real operating image 408 ($x^r \in X^r$) in the real domain to a fake virtual image 410 $x^f$. The discriminator 406 is a virtual discriminator characterized by the function $D(x^v; \theta_D)$ that discriminates whether an image is sampled from true virtual images 416 or from fake virtual images 410. The predictor 404 characterized by the function $P(x^v; \theta_P) \to y^v$. The predictor 404 is configured to map a fake virtual image 410 to a vehicle control command.

In one configuration, the learning objective of the DU-drive model 400 is:

$$\min_{\theta_G, \theta_P} \max_{\theta_D} \mathcal{L}_d(D, G) + \lambda L_t(P, G), \quad (1)$$

where, $\mathcal{L}_d(D, G)$ is the domain loss, which the generator 402 tries to minimize and the discriminator 406 tries to maximize in the minimax game of GAN. $\mathcal{L}_d(D, G)$ is defined as:

$$\mathcal{L}_d(D,G) \mathbb{E}_{x^v}[\log D(x^v; \theta_D)] + \quad (2)$$

$$\mathbb{E}_{x^r}[\log(1 - D(G(x^r; \theta_G); \theta_D))], \quad (3)$$

$\mathcal{L}_t(P, G)$ is the task specific objective for the predictor 404 and the generator 402, which is the mean square loss between the predicted control command and the ground truth control command. $\mathcal{L}_t(P, G)$ is defined as:

$$\mathcal{L}_t(P,G) = \mathbb{E}_{x^r}[\|P(G(x^r; \theta_G), \theta_P) - y^r\|_2^2] \quad (4)$$

$\lambda$ is a hyperparameter that controls the weight of task-specific loss and the domain loss.

Learning Process for the DU-Drive Model

As described above, the generator 402 of the DU-drive model 400 is trained to map a real operating image to its canonical representation in the virtual domain using a progressive training scheme. In this scheme, the supervision from the prediction task performed by the predictor 404 gradually drives the generator 402 to convert input real operating images 408 from the real domain to its corresponding canonical representation in the virtual domain that is most suitable for the prediction task. More formally, the learning objective of the DU-drive model in Equation 1 can be decomposed into three objective functions with respect to the three networks of the DU-drive model: the generator G 402, the predictor P 404, and the discriminator D 406:

$$\min_{\theta_G} \mathcal{L}_d(D, G) + \lambda L_t(P, G), \quad (5)$$

$$\min_{\theta_P} L_t(P, G), \quad (6)$$

$$\max_{\theta_D} \mathcal{L}_d(D, G) \quad (7)$$

The weight term $\lambda$, in Equation 6 is omitted, as it is easy to see that only $\theta G$ is influenced by both the domain loss and the prediction loss, and train $\theta D$, $\theta G$ and $\theta P$ are trained with respect to the three objectives above independently. $\alpha P$ is denoted as the learning rate for updating $\theta P$, and $\alpha GAN$ as the learning rate for updating $\theta D$ and $\theta G$.

During training, $\theta D$, $\theta G$ and $\theta P$ are updated sequentially by optimizing the above three objectives, so that the generation quality and prediction performance improves hand in hand. $\lambda$ is set to 0, and then increased progressively so that the weight of the task-specific loss will not go up too quickly at an early stage that it disturbs the equilibrium established between the generator 402 and the discriminator 406.

Domain Unification by the DU-Drive Model

Consider the case having multiple real image datasets $\{x^{r1}, y^{r1}\}, \ldots, \{x^{rm}, y^{rm}\}$. For example, one real dataset may correspond to real source images from comma.ai, while another real dataset may correspond to real source images from Udacity. Due to different data distribution depicted by road appearance, lighting conditions or driving scenes, each dataset belongs to a unique domain, denoted as $D_{r1}, \ldots, D_{rm}$ respectively. Prior works on end-to-end driving tend to deal with only one domain rather than a more general reasoning system. The DU-drive model, however, unifies data from different real domains into a single virtual domain and eliminates the notorious domain shift problem that results in mode collapse.

Figure 5:
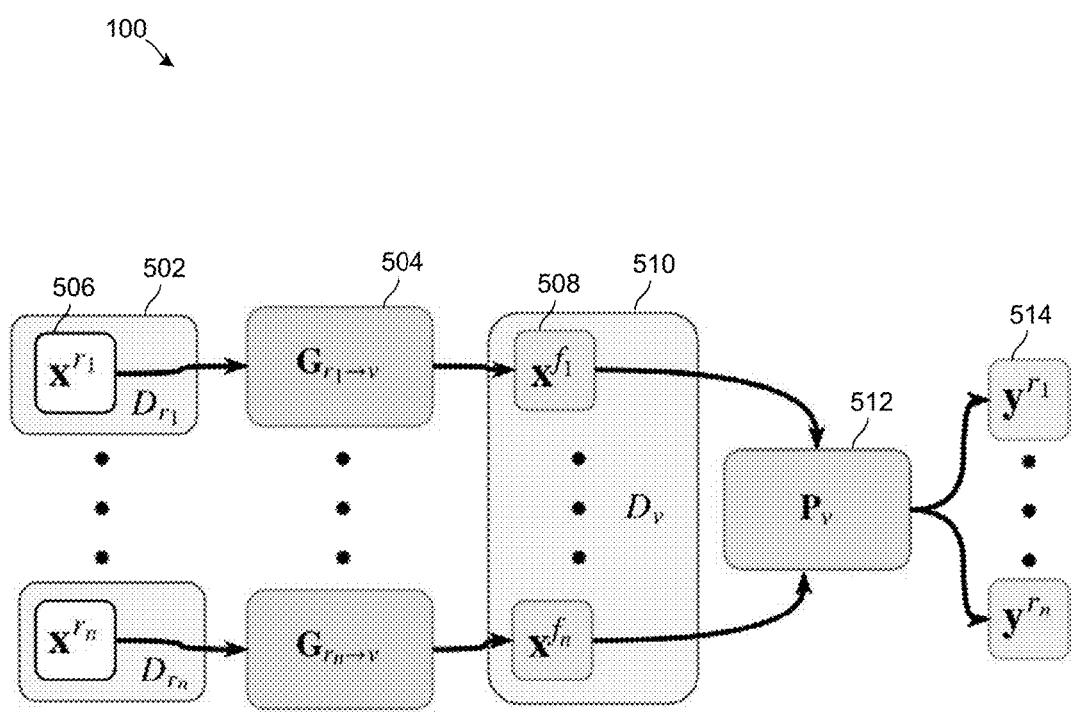
FIG. 5 is a block diagram of domain unification used to train the generator.

With reference to FIG. 5, for each real domain $D_{ri}$, 502 a local generator 504 is trained to transform real operating images $x^{ri}$ 506 into corresponding canonical representations $x^{fi}$ 508 in a unified virtual domain $D_v$ 510. These canonical representations $x^{fi}$ 508 are referred to herein as fake virtual images. A global predictor $P_v$ 512 is then trained to predict vehicle commands 514 from the transformed virtual images 508. To this end, each local generator 504 is fixed for each real domain, and the global predictor 512 is trained with labeled data from multiple real domains simultaneously. The global predictor 512 may be based on the network architecture used in DAVE-2 system described in M. Bojarski, D. Del Testa, D. Dworakowski, B. Firner, B. Flepp, P. Goyal, L. D. Jackel, M. Monfort, U. Muller, J. Zhang, et al. End to end learning for self-driving cars. arXiv preprint arXiv: 1604.07316, 2016.

DU-Drive Model Validation

Figure 6:
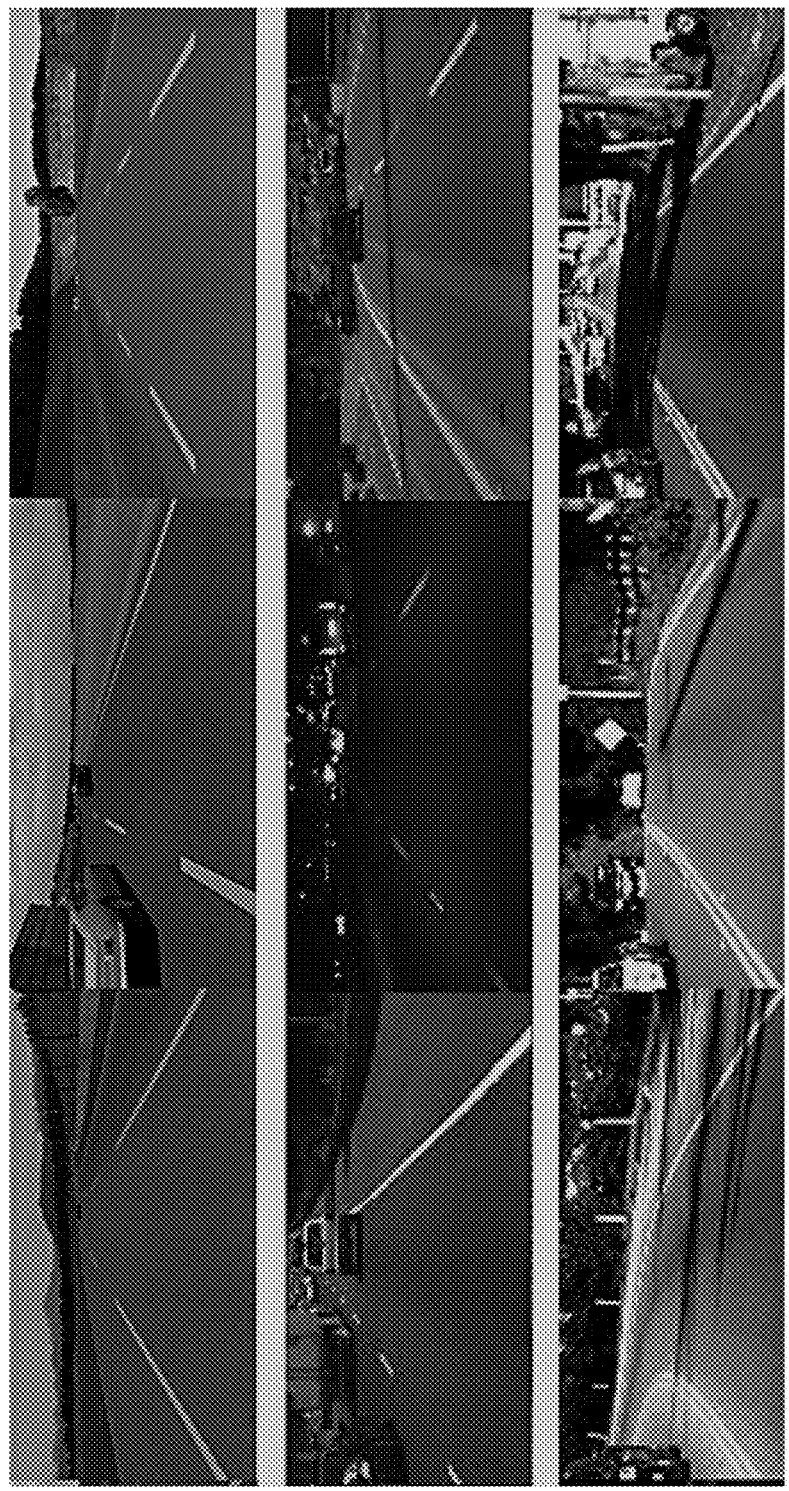
FIG. 6 are sample image data used during training and validation of the DU drive model, including virtual source images captured from a virtual driving simulator referred to as TORCS, real source images from a database referred to as comma.ai and real source images from another database referred to as Udacity.

The DU-drive model 400 was trained and tested based on virtual source images collected using an open-source racing simulator (TORCS), and real source images selected from known datasets including comma.ai and Udacity. With reference to FIG. 6, samples of virtual source images collected using TORCS and real source images from comma.ai and Udacity are shown.

Figure 7:
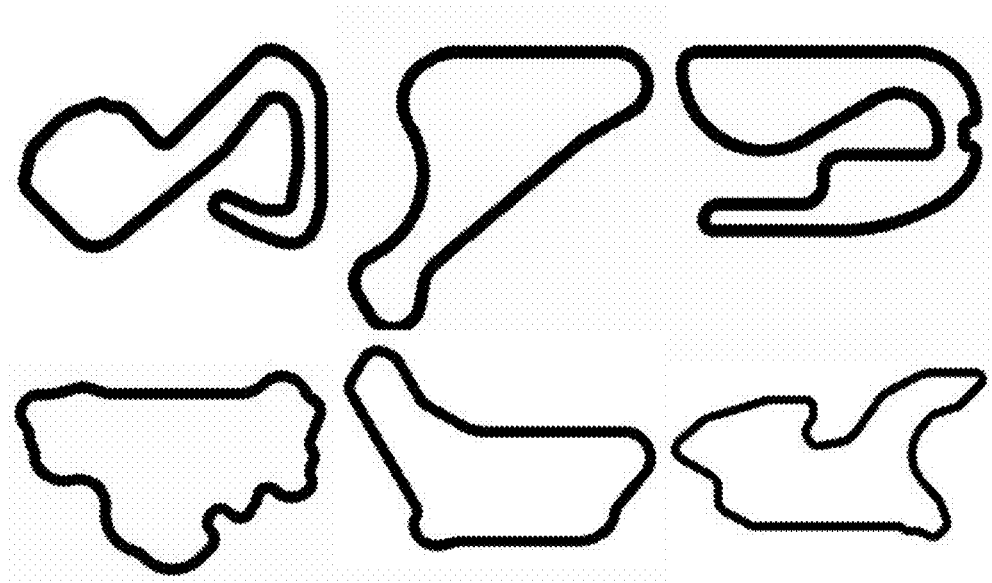
FIG. 7 are schematic illustrations of six tracks from a virtual driving simulator from which virtual source images like those in FIG. 6 were collected.

A virtual source image dataset with over thirty thousand frames of driving data was constructed using TORCS. A robot car that follows a simple driving policy was set up in TORCS as a host car, from which virtual frontal camera images and steering commands were captured. Also included were twelve traffic cars that follow a simple control logic, with random noise added to the control commands to encourage varied behaviors. With reference to FIG. 7, virtual source images were captured on six simulator tracks with different shapes. The lane settings were kept uniform across all tracks, i.e. with three equally spaced lanes where the robot cars run on, to serve as a canonical driving environment. To account for the imbalance of right turns and left turns in the virtual data, which could introduce bias in the domain transformation process, the data was augmented by flipping the image and negate the steering command.

A real source image dataset was constructed from two large-scale real-world datasets released by comma.ai and Udacity. Both datasets are composed of several episodes of highway driving videos. The comma.ai dataset contains 9 training episodes and 2 testing episodes. Three of the training episodes and one of the testing episodes are captured at night, while others are captured during the daytime. A data reader was used to filter out data points where the steering wheel angle is greater than 200. Good consistency could be observed for lighting/road conditions and roadside views. For Udacity dataset, the official release of training/testing data for challenge II was used. A relatively larger variance could be observed for lighting/road conditions and roadside views.

The data used is summarized below in Table 1.

TABLE 1

| Dataset | train/test frames | Lighting | size |
|---|---|---|---|
| Commai.ai | 345887/32018 | Day/Night | 160 × 320 |
| Udacity | 33808/5279 | Day | 240 × 320 |
| TORCS | 30183/3354 | Day | 240 × 320 |

The real source images to be input to the DU-drive model 400 were cropped to 160×320 by removing the extra upper part, which is usually background sky that does not change driving behavior. The real operating images were then resized to 80×320 and the pixel values were normalized to [−1, 1].

The prediction of steering angle was the focus of this test, though extensions to other vehicle commands should not be difficult. Instead of predicting the steering angle command directly, the inverse of the radius was predicted as it is more stable and invariant to the geometry of the data capturing car. The relationship between the inverse turning radius $u_t$ and steering angle $\theta_t$ is characterized by Ackermann steering geometry as:

$$\theta_t = u_t d_w K_s (1 + K_{slip} v_t^2) \qquad (8)$$

where, $\theta_t$ is the steering command in radius, $u_t$(1/m) is the inverse of the turning radius, $v_t$(m/s) is the vehicle speed at time t, $d_w$(m) stands for the wheelbase, which is the distance between the front and the rear wheel.

$K_{slip}$ is the slippery coefficient, and $K_s$ is the steering ratio between the turn of the steer and the turn of the wheels.

$d_w$ and $K_s$ are obtained from car specifics released by the respective car manufacturer of the data capturing vehicle, and $K_{slip}$ is provided by Comma.ai, which is estimated from real data. After predicting $u_t$, it is transformed back to $\theta_t$ according to Equation 8 and the mean absolute error of steering angle prediction is measured.

All the models were implemented in Tensorflow and trained on an NVIDIA Titan-X GPU. All networks are trained with Adam optimizer as disclosed in D. Kingma and J. Ba. Adam: A method for stochastic optimization. In *International Conference on Learning Representations,* 2015, and set $\beta_1$=0.5. The techniques used in J.-Y. Zhu, T. Park, P. Isola, and A. A. Efros. Unpaired image-to-image translation using cycle-consistent adversarial networks. In *The IEEE International Conference on Computer Vision (ICCV)*, October 2017 are used to stabilize the training.

First, using LSGAN, as disclosed in X. Mao, Q. Li, H. Xie, R. Y. Lau, and Z. Wang. Least squares generative adversarial networks. In *Proceedings of the IEEE International Conference on Computer Vision,* 2017, the conventional GAN objective is replaced by a lease square loss. Thus the loss function becomes:

$$\mathcal{L}_d(D,G) \mathbb{E}_{x^v}[D(x^v;\theta_D)^2]+ \qquad (9)$$

$$\mathbb{E}_{x^r}[(1-D(G(x^r;\theta_G);\theta_D))], \qquad (10)$$

Second, the discriminator is trained using a buffer of generated images to alleviate model oscillation. See A. Shrivastava, T. Pfister, O. Tuzel, J. Susskind, W. Wang, and R. Webb. Learning from simulated and unsupervised images through adversarial training. In *The IEEE Conference on Computer Vision and Pattern Recognition (CVPR)*, July 2017. A buffer size of 50 was used.

In order to take advantage of the labeled data collected from simulators, the predictor 512 is initialized with a model that is pretrained on virtual images. The predictor 512 cannot be trained with data from virtual and real datasets simultaneously as they are on different scales and no clear conversion rule exists. During pretraining, the batch size was set to 2000 and learning rate to 0.01.

At each step, $\theta_G$, $\theta_P$ and $\theta_D$ are sequentially updated with respect to the objective functions in Equations 5, 6 and 7. A batch size of 60 was used. The following setting were used: $\alpha_p$=0.0001 and $\alpha_{GAN}$=0.00001. A cliff function was used for the schedule of $\lambda$. $\lambda$=0 was set to zero for the first 2 epochs, then increased to 1. The model was trained for a total of 7 epochs.

After obtaining a real-to-virtual generator 504 for each real domain 502, the generator was fixed and a global predictor 512 was trained with all real datasets 506. The global predictor 512 was initialized with PilotNet pretrained on virtual data, and a learning rate of 0.001 and a batch size of 2000 was used for training.

The effectiveness of the DU-drive model 400 was evaluated in terms of the quality of the fake virtual images generated in the virtual domain and the mean absolute error of steering angle prediction. The performance of DU-drive model 400 was compared with the following baselines.

Vanilla end-to-end model (PilotNet): The first baseline is a vanilla end-to-end model, where a real driving image is directly mapped to a steering command. This is essentially the same model (PilotNet) as described in M. Bojarski, D. Del Testa, D. Dworakowski, B. Firner, B. Flepp, P. Goyal, L. D. Jackel, M. Monfort, U. Muller, J. Zhang, et al. End to end learning for self-driving cars. arXiv preprint arXiv: 1604.07316, 2016.

Finetune from virtual data: A straightforward way to do domain adaption is to finetune a model pretrained in the source domain with data in the target domain. A predictor 312 is first trained with virtual data only, then finetuned with the real dataset.

CycleGAN: CycleGAN is a method to do unpaired image-to-image translation, which could also be applied to transforming real driving images to the virtual domain. It uses one generative adversarial network $G_{X2Y}$ to transform image x from domain X to image $G_{X2Y}(x)$ in domain Y, and another generative adversarial network $G_{Y2X}$ to transform $G_{X2Y}(x)$ back to an image $G_{Y2X}(x)$) in domain X. A cycle consistency loss is employed to ensure that $G_{Y2X}(G_{X2Y}(x))=x$.

Conditional GAN: A naive implementation of conditional GAN (cGAN) uses a generator G to transform an image x from the real domain to an image G(x) in the virtual domain. A discriminative network D is set up to discriminate G(x) from y sampled from the virtual domain while G tries to fool the discriminator. No additional supervision is provided other than the adversarial objective. A PilotNet to is trained to predict steering angle from the fake virtual image generated by cGAN.

PilotNet joint training: To verify the effectiveness of the domain unification model, a PilotNet is directly trained with two labeled real datasets simultaneously.

Quantitative Results: The performance of steering command prediction for a single real domain of a DU-drive model 400, referred to as a DU-drive(single) model, is compared with a steering command prediction for a plain end-to-end model (PilotNet), finetuned from virtual data and conditional GAN without joint training. The results are shown in Table 2, which presents steering angle prediction performance in terms of mean absolute error (MAE) and its standard deviation (SD), shows that the DU-drive model 400 outperforms all baseline methods.

TABLE 2

| Dataset | Model | MAE | SD |
| --- | --- | --- | --- |
| Comma.ai | PilotNet | 1.208 | 1.472 |
| | Finetune TORCS | 1.203 | 1.500 |
| | cGAN | 1.215 | 1.405 |
| | PilotNet joint training | 5.988 | 11.670 |
| | DU-Drive(single) | 1.061 | 1.319 |
| | DU-Drive(unified) | 1.079 | 1.270 |
| Udacity | PilotNet | 6.018 | 7.613 |
| | Finetune TORCS | 5.808 | 7.721 |
| | cGAN | 5.921 | 6.896 |
| | PilotNet joint training | 15.040 | 27.636 |
| | DU-Drive(single) | 4.558 | 5.356 |
| | DU-Drive(unified) | 4.521 | 5.558 |

Both DU-drive(single) and finetuning from virtual data performs better than plain end-to-end model, which verifies the effectiveness of introducing labeled virtual data. The DU-drive model 400 outperforms finetuning by 12%/20% for Comma.ai/Udacity dataset respectively with the same training data and prediction network but different input data representation. This verifies the superiority of the feature of the DU-drive model, where complex real images are transformed into their canonical representation in the virtual domain for driving command prediction task. Conditional GAN without joint training does not perform well as adversarial objective itself is not enough to ensure the preservation of label.

Figure 8:
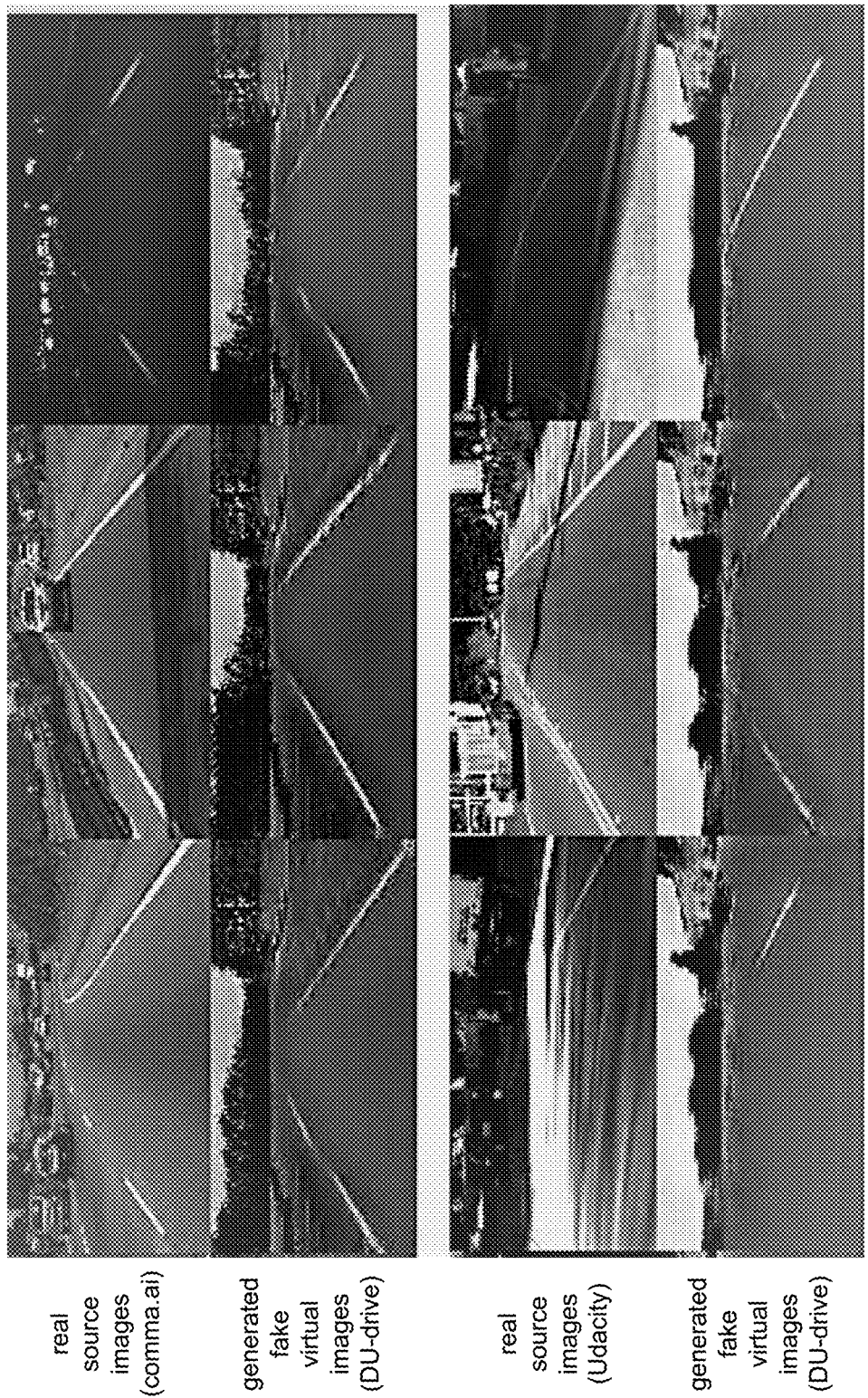
FIG. 8 are real source images from comma.ai and corresponding fake virtual images generated by the DU drive model, and real source images from Udacity and corresponding fake virtual images generated by the DU drive model.

Qualitative Results: With reference to FIG. 8, sample fake virtual images generated by DU-drive model 400 show that the model is able to transform real source images to their canonical representations in the virtual domain. Lane markings are preserved, while superfluous details including views beyond the road and lighting conditions are unified into clean grayish grounds. Vehicles are also removed from the scenes. The unification and/or removal of image elements by the DU-drive model 400 is acceptable as the DU-drive model is configured to predict steering angle based on lane markings, which are preserved.

A critical advantage of the DU-drive model 400 is that data collected from different sources could be unified to the same virtual domain. As shown in FIG. 8, real source images from comma.ai dataset and those from Udacity dataset are transformed into their canonical representations, i.e., fake virtual images, in a unified virtual domain, whose superiority is directly reflected in the performance of steering angle prediction task. As shown in Table 2, prior models (PilotNet) that jointly train a network with data from two real domains together leads to results much worse than training each one separately due to domain shift. However, with DU-drive (unified), a single network could process data from multiple real domains with comparable results with DU-drive (single). Moreover, the DU-drive model separates the transformation and prediction process, and a generator could be independently trained for a new real dataset.

Figure 9:
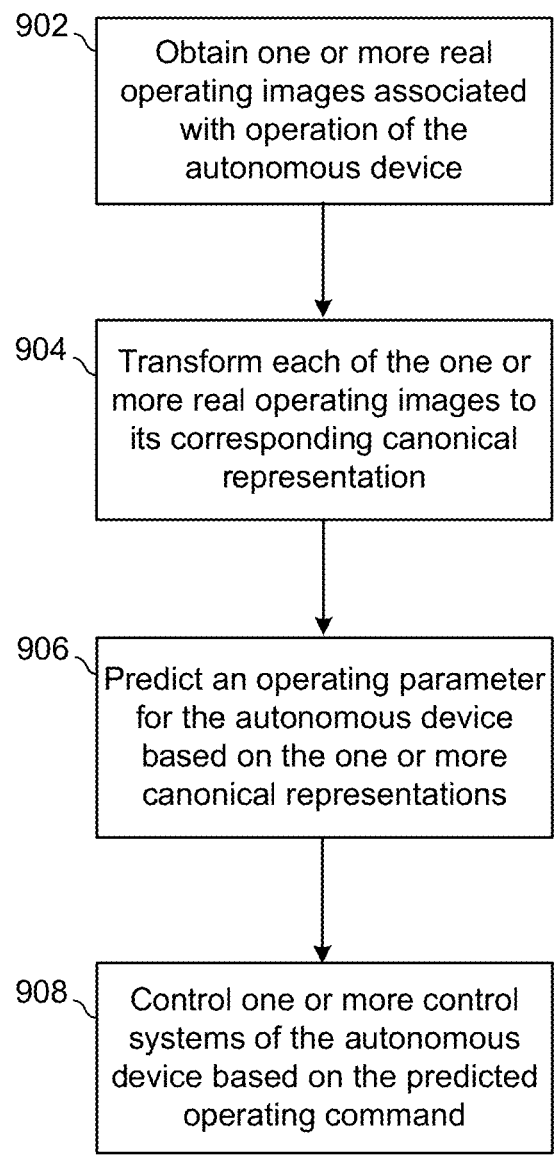
FIG. 9 is a flowchart of a method of commanding an operation of an autonomous device.

FIG. 9 is a flowchart of method of commanding an operation of an autonomous device. The method may be performed, for example, by one or more modules of the DU-drive model 400 of FIG. 4. The autonomous device may be any device that operates autonomously or semi-autonomously, such as a car, boat, plane, drone, or robot.

At block 902, the DU-drive model 400 obtains one or more real operating images 408 associated with operation of the autonomous device. The real operating images 408 may be obtained from a camera associated with the autonomous device. For example, in the case of commanding a steering operation of the autonomous device, the real operating images 408 may be obtained from a front-facing camera of the device.

The real operating images 408 include predictive information and background information. The predictive information corresponds to information relative to the operation to be commanded. For example, if the operation relates to steering the device, then predictive information may include lane marking on the road, such as shown in the images of FIG. 8 labeled real driving images. Conversely, background information corresponds to information that is not relevant or essential to the operation to be commanded. Again, if the operation relates to steering the device, then background information may include vehicles or other objects in the horizon or off to either side of the, such as shown in the images of FIG. 8 labeled real driving images.

At block 904, the DU-drive model 400 transforms each of the one or more real operating images 408 to its corresponding canonical representation 410. This transformation may be performed by a generator module 402. The real operating images 408 may be transformed to corresponding canonical representations 410 in a single unifying virtual domain.

In one embodiment, the DU-drive model 400 transforms a real operating image 408 to a corresponding canonical representation 410 by mapping the real operating image to a corresponding unique, pixel-level fake virtual image sampled from a database of true virtual images. These canonical representations 410, or fake virtual images, contain sufficient predictive information from which to predict an operating parameter and substantially no background information. For example, in comparing the images of FIG. 8, the fake virtual images include lane markings for purposes of predicting a steering command, but do not include side or horizon vehicles that are irrelevant to steering command prediction. In one configuration, the true virtual images to which real operating images are mapped are generated using computer graphics technology for an operating experience of the autonomous device, and are annotated with corresponding ground-truth operating parameters of the autonomous device.

At block 906, the DU-drive model 400 predicts an operating parameter 412 for the autonomous device based on the one or more canonical representations. This prediction may be performed by a predictor module 404. To this end, the database of true virtual images to which real operating images are mapped may also be used to train a predictor 404 to predict an operating parameter based on the canonical representations. For example, the predictor 404 may be trained to minimize the mean square loss between predicted controlling commands and ground-truth controlling commands from human experts. Continuing with the steering example, the operating parameter 412 may be a moving angle of the autonomous device.

At block 908, the DU-drive model 400 controls one or more control systems of the autonomous device based on the predicted operating parameter. To this end, the DU-drive model 400 may output a control signal to a control system, such a steering control system, of the autonomous device.

The generator module 402 and the predictor module 404 of the DU-drive model 400 are respectively trained to generate canonical representations 410 of real operating images 408, and to predict the operating parameter 412 based on the canonical representation 410. In one embodiment, the generator module 402 and the predictor module 404 are trained simultaneous in parallel using a generative adversarial neural network (GAN) in an unsupervised manner. The training is done using a first database of real source images, such as shown in FIG. 6, and a second database of virtual source images, also shown in FIG. 6. The real source images may be annotated with corresponding ground-truth operating parameters obtained from a real operating experience, while the second database of virtual source images may be annotated with corresponding ground-truth operating parameters obtained from the same operating experience. The virtual source images may be generated using computer graphics technology. During training using the GAN, an objective of the generator module 402 is to increase its ability to generate fake virtual images 410 that fool a discriminator module 406, while an objective of the discriminator module 406 is to increase its ability to correctly discriminates fake virtual images 410 from true virtual images 416.

Figure 10:
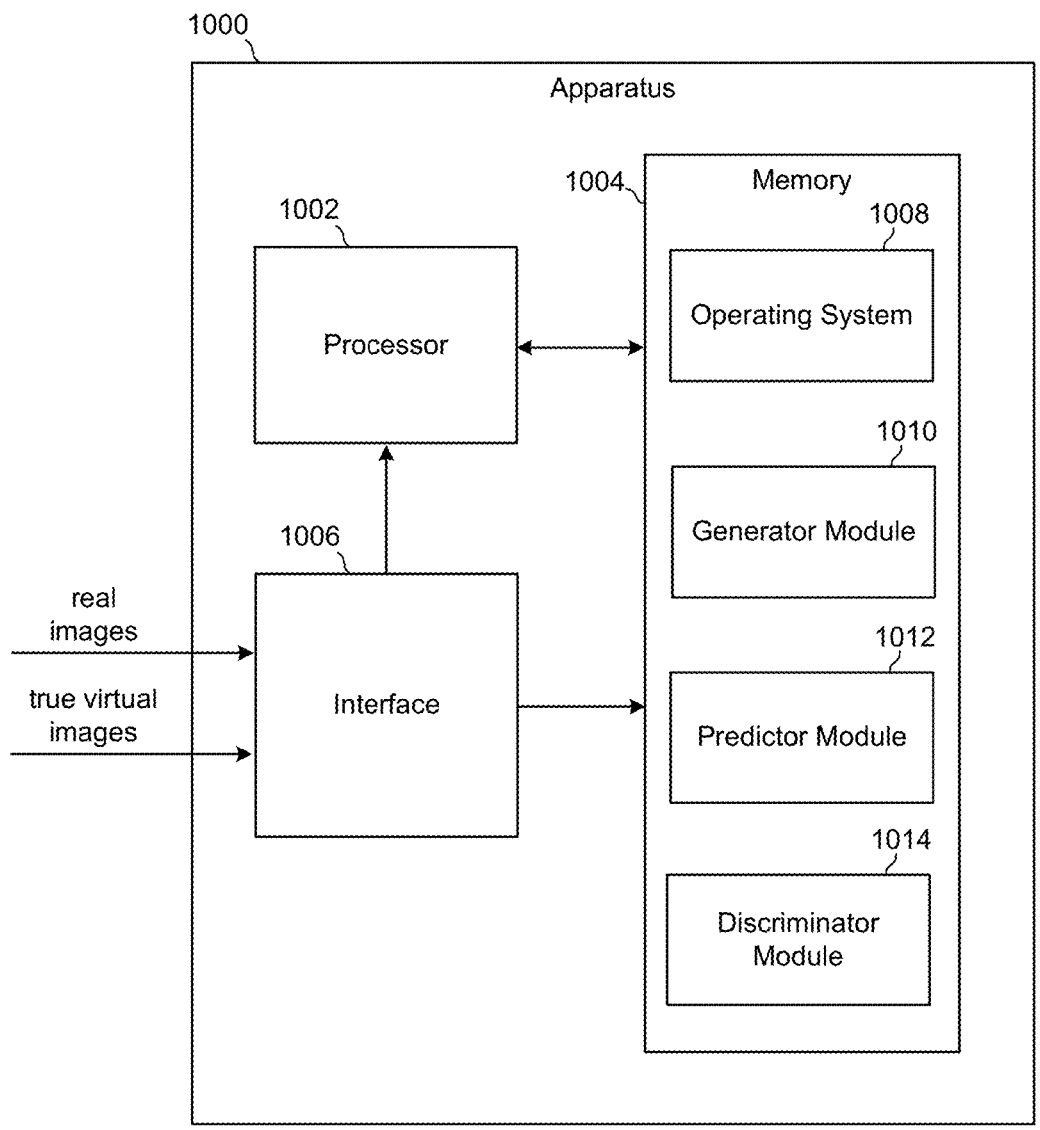
FIG. 10 is a block diagram of an apparatus configured to implement the method of FIG. 9.

FIG. 10 is a schematic block diagram of an apparatus 1000. The apparatus 1000 may correspond to one or more modules of the DU-drive model 400 of FIG. 4 configured to enable the method of commanding an operation of an autonomous device, as described above with reference to FIG. 9.

The apparatus 1000 may include one or more processors 1002 configured to access and execute computer-executable instructions stored in at least one memory 1004. The processor 1002 may be implemented as appropriate in hardware, software, firmware, or combinations thereof. Software or firmware implementations of the processor 1002 may include computer-executable or machine-executable instructions written in any suitable programming language to perform the various functions described herein. The processor 1002 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 1000 may also include a chipset (not shown) for controlling communications between the processor 1002 and one or more of the other components of the apparatus 1000. The processor 1002 may also include one or more application-specific integrated circuits (ASICs) or application-specific standard products (ASSPs) for handling specific data processing functions or tasks.

The memory 1004 may include, but is not limited to, random access memory (RAM), flash RAM, magnetic media storage, optical media storage, and so forth. The memory 1004 may include volatile memory configured to store information when supplied with power and/or non-volatile memory configured to store information even when not supplied with power. The memory 1004 may store various program modules, application programs, and so forth that may include computer-executable instructions that upon execution by the processor 1002 may cause various operations to be performed. The memory 1004 may further store a variety of data manipulated and/or generated during execution of computer-executable instructions by the processor 1002.

The apparatus 1000 may further include one or more interfaces 1006 that may facilitate communication between the apparatus 1000 and one or more other apparatuses. For example, the interface 1006 may be configured to receive one or more of real images from a camera mounted to an autonomous vehicle, real images from a dataset, and virtual images from a dataset.

The memory 1004 may store various program modules, application programs, and so forth that may include computer-executable instructions that upon execution by the processor 1002 may cause various operations to be performed. For example, the memory 1004 may include an operating system module (O/S) 1008 that may be configured to manage hardware resources such as the interface 1006 and provide various services to applications executing on the apparatus 1000.

The memory 1004 stores additional program modules such as a generator module 1010, a predictor module 1012, and a discriminator module 1014, one or more of which may be embodied in the form of a deep learning algorithm or neural network trained to support and enable the aspects of the method of the method of commanding an operation of an autonomous device, as described above with reference to FIG. 9. Each of the generator module 1010, a predictor module 1012, and a discriminator module 1014 includes computer-executable instructions that when executed by the processor 1002 cause various operations to be performed, such as the operations described above with respect to FIGS. 4, 5 and 9.

The apparatus 1000 and modules 1010, 1012, 1014 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of commanding an operation of an autonomous device, the method comprising:
   obtaining, by a domain unification (DU)-drive model, one or more real operating images associated with operation of the autonomous device;
   transforming, by the DU-drive model, each of the one or more real operating images to its corresponding canonical representation, wherein the canonical representation of a real operating image from the one or more real operating images, is a pixel-level fake virtual image of the real operating image, and wherein the transforming each of the one or more real operating images comprises:
      mapping each of the one or more real operating images to a corresponding true virtual image sampled from a database of true virtual images having true virtual images that are annotated with corresponding ground-truth operating parameters of the autonomous device; and
   predicting, by the DU-drive model, an operating parameter for the autonomous device based on the one or more canonical representations by training the DU-drive model to minimize a mean square loss between the predicted operating parameter and the ground truth operating parameter of the autonomous device, wherein the one or more real operating images comprise predictive information and background information and its corresponding canonical representation contains at least some of the predictive information from which to predict the operating parameter, wherein the predictive information corresponds to lane markings on a road, wherein the DU-drive model predicts the operating parameter to be a steering angle based on the lane markings.

2. The method of claim 1, wherein the one or more real operating images are obtained from a camera associated with the autonomous device.

3. The method of claim 1, wherein the background information corresponds to one or more of objects in a horizon or off to either side of the road.

4. The method of claim 1, wherein the true virtual images in the database are related to an operation of a computer simulated device and are generated using computer graphics technology.

5. The method of claim 1, wherein predicting the operating parameter comprises predicting a moving angle of the autonomous device.

6. The method of claim 1, further comprising:
   controlling one or more control systems of the autonomous device based on the predicted operating parameter.

7. The method of claim 1, further comprising:
   generating the canonical representation of a real operating image of the one or more real operating images; and
   predicting the operating parameter based on the generated canonical representation.

8. The method of claim 7, wherein the generation of the canonical representation and the prediction of the operating parameter comprises using a generative adversarial neural network (GAN) using a first database of real source images annotated with corresponding ground-truth operating parameters obtained from a real operating experience, wherein the real source images are images of real-world scenes related to the operation of other autonomous devices, and a second database of virtual source images annotated with corresponding ground-truth operating parameters obtained from the same operating experience, wherein the virtual source images are generated using computer graphics technology.

9. The method of claim 8, wherein generating the canonical representation of the real operating image by using the GAN comprises:
   generating fake virtual images for fooling a process of discrimination performed to discriminate fake virtual images from true virtual images, and
   correctly discriminating the generated fake virtual images from true virtual images.

10. An apparatus for commanding an operation of an autonomous device, the apparatus comprising:
    a memory; and
    a processor coupled to the memory and configured to:
       obtain one or more real operating images associated with operation of the autonomous device, and
       transform each of the one or more real operating images to its corresponding canonical representation, wherein the canonical representation of a real operating image from the one or more real operating images, is a pixel-level fake virtual image of the real operating image, and wherein the transforming each of the one or more real operating images comprises:
          mapping each of the one or more real operating images to a corresponding true virtual image sampled from a database of true virtual images having true virtual images that are annotated with corresponding ground-truth operating parameters of the autonomous device; and predict an operating parameter for the autonomous device based on the one or more canonical representations by training the processor to minimize a mean square loss between the predicted operating parameter and the ground-truth operating parameter of the autonomous device, wherein the one or more real operating images comprise predictive information and background information and its corresponding canonical representation contains at least some of the predictive information from which to predict the operating parameter, wherein the predictive information corresponds to lane markings on a road, wherein the processor predicts the operating parameter to be a steering angle based on the lane markings.

11. The apparatus of claim 10, wherein the one or more real operating images are obtained from a camera associated with the autonomous device.

12. The apparatus of claim 10, wherein the background information comprises one or more of objects in a horizon or off to either side of the road.

13. The apparatus of claim 10, wherein the true virtual images in the database are related to an operation of a computer simulated device and are generated using computer graphics technology.

14. The apparatus of claim 10, wherein the processor is further configured to output a signal that controls one or more control systems of the autonomous device based on the predicted operating parameter.

15. The apparatus of claim 10, wherein the autonomous device is one of an autonomous or semi-autonomous car, drone, and robot.

16. The apparatus of claim 10, wherein the processor is configured to:
generate the canonical representation of a real operating image of the one or more real operating images; and
predict the operating parameter based on the generated canonical representation.

17. The apparatus of claim 16, wherein for generating the canonical representation, the processor is configured to map the real operating image to the canonical representation of the real operating image that contains the at least some of the predictive information from which to predict the operating parameter.

18. The apparatus of claim 16, wherein for generating the canonical representation and predicting the operating parameter, the processor is configured to use a generative adversarial neural network (GAN) using a first database of real source images annotated with corresponding ground-truth operating parameters obtained from a real operating experience, wherein the real source images are images of real-world scenes related to the operation of other autonomous devices, and a second database of virtual source images annotated with corresponding ground-truth operating parameters obtained from the same operating experience, wherein the virtual source images are generated using computer graphics technology.

19. The apparatus of claim 18, wherein generating the canonical representation of the real operating image by using the GAN comprises:
generating fake virtual images for fooling a process of discrimination performed to discriminate fake virtual images from true virtual images, and
correctly discriminating the generated fake virtual images from the true virtual images.

* * * * *